(No Model.) 2 Sheets—Sheet 1.

E. NIXON.
POWER INDICATOR AND RECORDER.

No. 424,218. Patented Mar. 25, 1890.

WITNESSES:
F. McArdle.
C. Sedgwick

INVENTOR:
E. Nixon
BY
Munn & Co.
ATTORNEYS.

(No Model.) 2 Sheets—Sheet 2.

E. NIXON.
POWER INDICATOR AND RECORDER.

No. 424,218. Patented Mar. 25, 1890.

WITNESSES:
F. M. Ardle
C. Sedgwick

INVENTOR:
E. Nixon
BY Munn & Co.
ATTORNEYS.

UNITED STATES PATENT OFFICE.

EMERY NIXON, OF TORONTO, ONTARIO, CANADA, ASSIGNOR OF ONE-HALF TO WALLACE MILLICHAMP, OF SAME PLACE.

POWER INDICATOR AND RECORDER.

SPECIFICATION forming part of Letters Patent No. 424,218, dated March 25, 1890.

Application filed July 31, 1889. Serial No. 319,282. (No model.)

*To all whom it may concern:*

Be it known that I, EMERY NIXON, machinist, a citizen of the United States, and a resident of the city of Toronto, in the county of York, in the Province of Ontario, Canada, have invented a new and Improved Power-Indicator, of which the following is a full, clear, and exact description.

The object of the invention is to provide a new and improved power-indicator, which is simple and durable in construction, and when applied accurately measures or weighs the power necessary to operate a machine or a number of machines driven from the same shaft, at the same time automatically recording the required amount of power.

The invention consists of a wheel secured on the driving-shaft and turning the driving-pulley, an arm held to turn on the said wheel and pressing against the spring on the said wheel, and a bar operated from the said arm and connected with an indicator.

The invention also consists of certain parts and details and combinations of the same, as will be hereinafter fully described, and then pointed out in the claims.

Reference is to be had to the accompanying drawings, forming a part of this specification, in which similar letters of reference indicate corresponding parts in all the figures.

Figure 1:
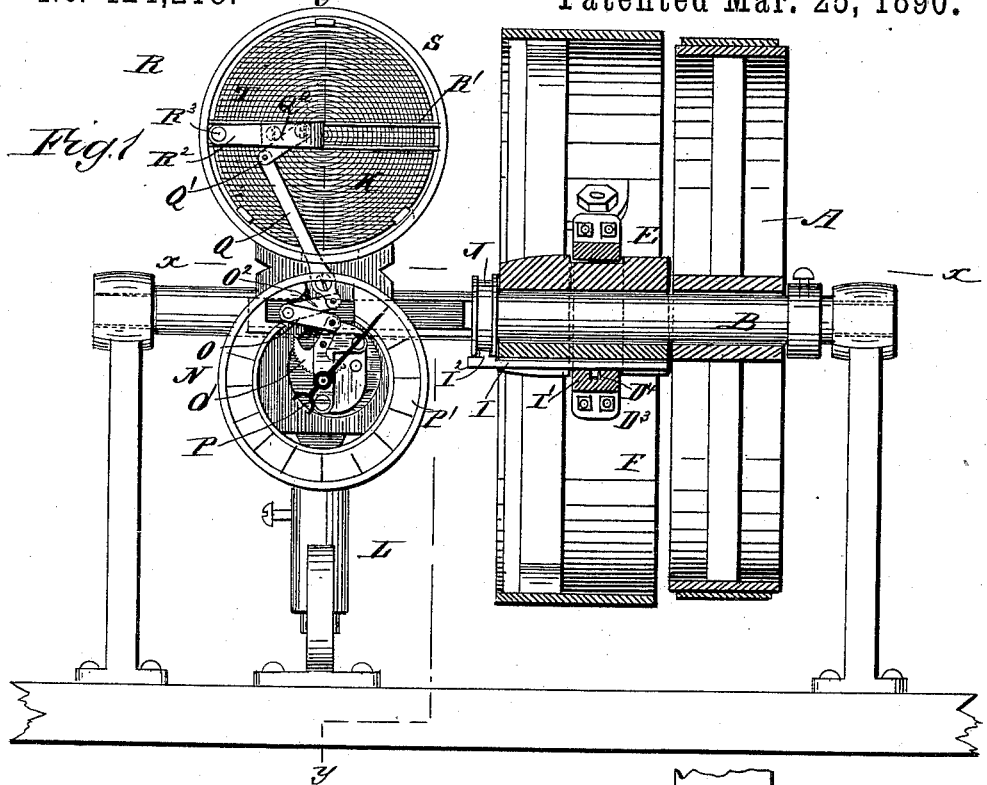
Figure 2:
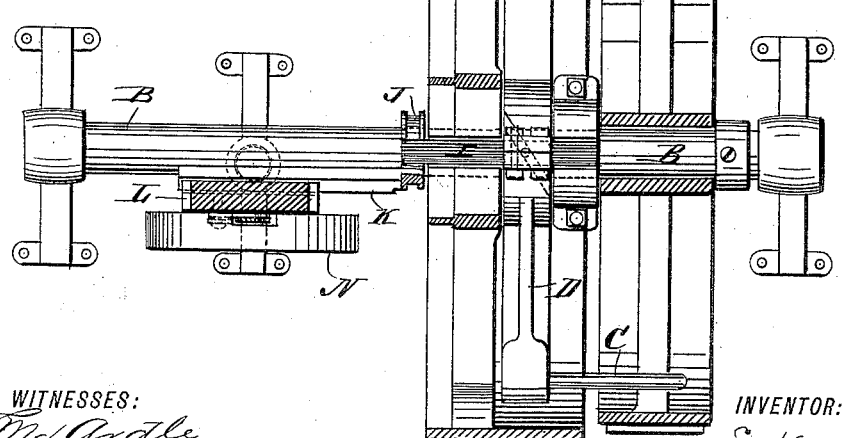
Figure 3:
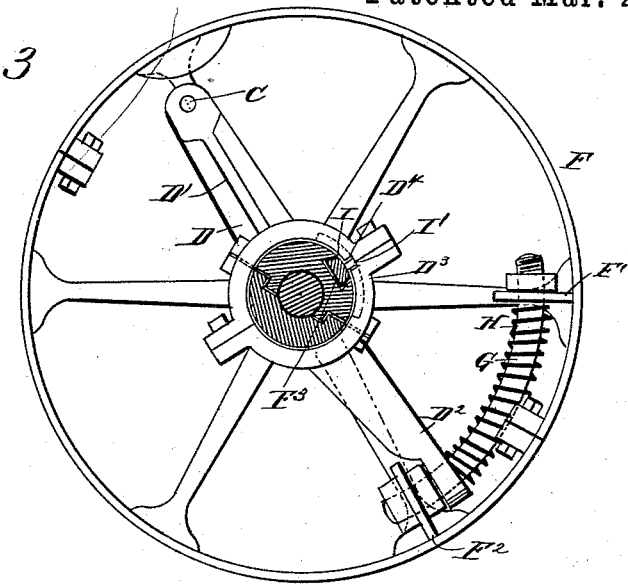
Figure 6:
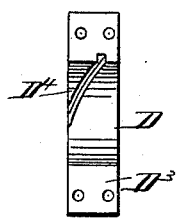
Figure 7:
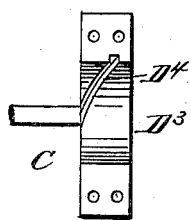
Figure 4:
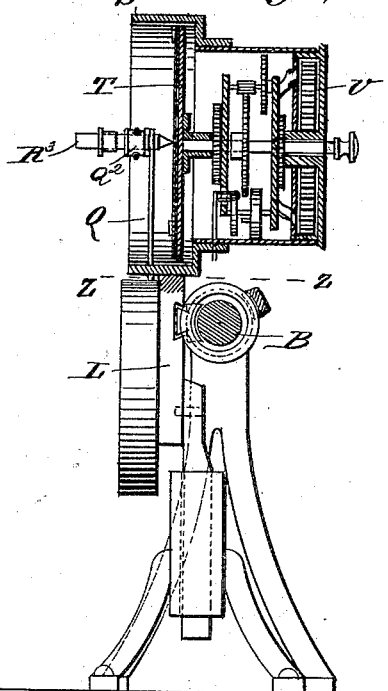
Figure 5:
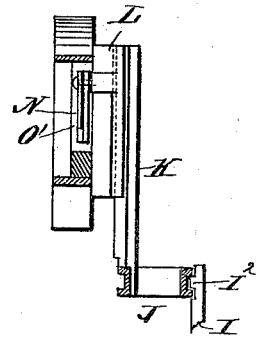

Figure 1 is a side elevation of the improvement, with parts in section. Fig. 2 is a sectional plan view of the same on the line $x\ x$ of Fig. 1. Fig. 3 is a sectional face view of the wheel and connections. Fig. 4 is a transverse section of the improvement on the line $y\ y$ of Fig. 1. Fig. 5 is a sectional plan view of part of the improvement on the line $z\ z$ of Fig. 4, and Figs. 6 and 7 are face views of the hub of the arm.

The driving-pulley A is mounted to turn loosely on the driving-shaft B, and connects by suitable means with the machinery to be driven. The driving-pulley A is turned by means of a pin C, engaging one of its spokes and secured on an arm D, preferably made in two parts D' and $D^2$, clamped loosely on the hub E of a wheel F, secured on the driving-shaft B. The end D' of the arm D carries the said pin C, while the end $D^2$ is guided on a segmental arm G, secured in lugs F' and $F^2$, formed on the inside of the rim of the wheel F. Against the end $D^2$ of the arm presses one end of a spring H, coiled on the said segmental arm G, its other end resting on the lug F'. In the hub $D^3$ of the arm D is formed a spiral groove $D^4$, into which fits a pin I', secured on a dovetailed bar I, fitted to slide in a correspondingly-shaped groove $F^3$, formed in the hub of the wheel F. The bar I extends parallel with the shaft B and is provided on its outer end with a lug $I^2$, engaging an annular groove in a ring J, held concentric with the shaft B and provided with a bar K, extending parallel with said shaft B and operating the indicator N, mounted on a suitable standard L.

The bar K is pivotally connected by a link O with a segmental gear-wheel O', fulcrumed in the casing of the indicator N and operating the pointer P, indicating over a dial P' of the said indicator N. The bar K is also pivotally connected by a link $O^2$ with one end of a lever Q, operating the registering device R by being connected by a link Q' with a slide $Q^2$, mounted to travel horizontally in suitable guideways R', secured on the recording device R. From the slide $Q^2$ extends a spring $R^2$, supporting in its rear end a pencil $R^3$, adapted to mark on a graduated card T, mounted to turn in the indicator-casing S by means of a suitable clock-work U.

The operation is as follows: When the shaft B is at a standstill, the pencil $R^3$ is in its outermost position, as shown in Fig. 1, and the pointer P stands at zero. When the shaft B is turned, the wheel F is turned with the shaft, and the spring G, carried by the said wheel F, pressing against the arm D, causes the latter to turn with the wheel F, and by its pin C causes the driving-pulley A to turn with the shaft. The rotary motion of the latter is transmitted by the pulley A to the machinery to be driven, and according to the load of the driven machinery the spring G is compressed by the action of the pulley A on the pin C, pressing the end D' of the arm D against the spring G. The arm D consequently turns on the hub of the wheel F, so that the pin I' is moved longitudinally by being engaged in the spiral groove $D^4$ of the said arm D. The bar I moves outward, whereby the ring J and its bar K are moved in the same direction, and the link O turns the segmental gear-wheel O', whereby the pointer P turns and indicates the amount of the load on the dial P'. At the same time the movement of the bar K operates the recording device R by the link O², connected with the said bar K, turning the lever Q, and the latter by its connection with the slide Q², supporting the pencil R³, moves the latter inward on the graduated card T, which is rotated by the clock-work U.

According to the increase or decrease of the load hung on the pulley A, the spring H presses with more or less force against the end D² of the bar D, so that the latter turns on the hub of the wheel F, and consequently the bar I is moved inward or outward, causing a corresponding movement of the bar K and a corresponding motion of the pointer P and the pencil R³. The power of the driving-shaft B is thus measured, and consequently the amount of work of the machine or machines connected with the said shaft, as before described.

Having thus described my invention, I claim as new and desire to secure by Letters Patent—

1. In a power-indicator, the combination, with a wheel adapted to be secured to the driving-shaft, of an arm with spirally-grooved hub arranged loosely on the hub of the said wheel and pressing against a spring held on the said wheel, and a sliding bar arranged parallel with the drive-shaft and having a pin entering the groove of the hub of the said arm and connected with an indicator, substantially as shown and described.

2. In a power-indicator, the combination, with a wheel secured on the driving-shaft, of an arm held loosely on the said wheel and adapted to drive the driving-pulley held loosely on the said shaft, an arm held to turn loosely on the hub of the said wheel, a spring held on the said wheel and against which presses the said arm, and a sliding bar operated from the said arm and connected with an indicator and a recorder, substantially as shown and described.

3. In a power-indicator, the combination, with an arm mounted to turn and a spring pressing against the said arm with the load to be indicated, of a sliding bar provided with a pin fitting into a spiral groove of the said arm, and an indicator and a recorder operated by the said sliding arm, substantially as shown and described.

4. In a power-indicator, the combination, with a bar mounted to slide, of an indicator operated by the said slide and a recorder provided with a pencil operated from the said arm, and also provided with a paper card turned by a clock-work, and on which operates the said disk, substantially as shown and described.

5. In a power-indicator, the combination, with a bar mounted to slide, of a recorder comprising a pencil operated from the said sliding bar, a paper card mounted to turn and on which operates the said pencil, and a clock-work for turning the said paper, substantially as shown and described.

6. In a power-indicator, the combination, with a wheel secured on the driving-shaft and a spring held on the said wheel, of an arm mounted to turn on the hub of the said wheel pressing against the said spring and adapted to turn the driving-pulley, and a bar arranged parallel to the drive-shaft and operated by the said arm and actuating an indicator, substantially as shown and described.

7. In a power-indicator, the combination, with a wheel secured on the driving-shaft and a spring held on the said wheel, of an arm mounted to turn on the hub of the said wheel pressing against the said spring and adapted to turn the driving-pulley, and a bar arranged parallel to the drive-shaft and operated by the said arm and actuating an indicator and a recorder, substantially as shown and described.

EMERY NIXON.

Witnesses:
H. VINCENT GREENE,
THOMAS PARKER.